United States Patent [19]

Myers

[11] Patent Number: 4,764,573
[45] Date of Patent: Aug. 16, 1988

[54] ELECTRICALLY CONDUCTIVE PYRROLE POLYMERS

[75] Inventor: Ronald E. Myers, Strongsville, Ohio

[73] Assignee: The BFGoodrich Company, Akron, Ohio

[21] Appl. No.: 761,711

[22] Filed: Aug. 2, 1985

Related U.S. Application Data

[63] Continuation-in-part of Ser. No. 618,701, Jun. 8, 1984, abandoned.

[51] Int. Cl.$^4$ ............................ C08F 4/06; C08F 4/40
[52] U.S. Cl. ........................................ 526/90; 526/258; 252/519
[58] Field of Search .................... 526/258, 90; 252/519

[56] References Cited

U.S. PATENT DOCUMENTS 4,401,545 8/1983 Noormann et al. .................... 204/72
4,468,291 8/1984 Noormann et al. .................... 204/72

FOREIGN PATENT DOCUMENTS 3321281 12/1983 Fed. Rep. of Germany.

OTHER PUBLICATIONS

Robert B. Bjorklund et al., Journal of Electronic Materials, vol. 13, No. 1 (1984)—"Some Properties of Polypyrrole—Paper Composites" pp. 211–230.

Primary Examiner—Joseph L. Schofer
Assistant Examiner—J. M. Reddick
Attorney, Agent, or Firm—Alfred D. Lobo; James R. Lindsay

[57] ABSTRACT

A process is provided for forming an electrically conductive polymer of a pyrrole monomer, optionally substituted at the 3- and 4- positions. The process comprises dispersing a polymerization initiator selected from the group consisting of anhydrous halides of iron, cobalt or nickel (Group VIII metal) in an anhydrous liquid reaction medium and, adding essentially pure pyrrole monomer, or a solution of the monomer in the liquid at a temperature in the range from about $-20°$ C. to below about the boiling point of the solution. The pyrrole polymer so formed is a Group VIII metal halide counterion, and a conductor having a conductivity in the range from about 1 to about 150 ohm$^{-1}$cm$^{-1}$ ("S/cm" for brevity), or a semiconductor having a conductivity in the range from about $10^{-3}$ to about 1 S/cm, depending upon the particular structure of the monomer, the ratio of the initiator to pyrrole monomer, and the molecular weight of the polymer formed. Ratios greater than 4 generally yield conductors, while ratios in the range from about 0.25 to 4 yield semiconductors. Conductive polypyrrole having only a chloride or bromide counterion is formed in acetonitrile. The chemical process of this invention may be used to form the pyrrole polymer on a substrate such as paper by soaking it in liquid pyrrole, then dipping the pyrrole-impregnated paper into a solution of anhydrous ferric chloride in diethyl ether.

18 Claims, No Drawings

ELECTRICALLY CONDUCTIVE PYRROLE POLYMERS

CROSS REFERENCE TO RELATED APPLICATION

This is a continuation-in-part application of Ser. No. 618,701 filed June 8, 1984 now abandoned.

BACKGROUND OF THE INVENTION

This invention relates to organic conductors and semiconductors which fall into the group of polymeric pyrrole conductors. As is well known, such conducting polymers defy conventional melt-processing, cannot be compacted, whether molded or extruded, in the usual ways, nor deposited as a continuous film from solution; and, they are far from stable in air even at ambient temperature conditions. A polymer which defies compaction into a shaped article, places severe limitations upon its use. Certain pyrrole polymers made by electrodeposition are found to be compactable (see copending U.S. patent application Ser. No. 486,161, filed Apr. 18, 1983 now U.S. Pat. No. 4,543,402), and to form self-supporting films, but this process is too slow for general commercial utility. The problem was to find a relatively fast nonelectrochemical process which yielded a compactable conductor (the term "conductor" as used herein includes semiconductors) so that the polypyrroles formed might be more versatile in their applications.

By "semiconductors" I refer to polymers of pyrrole/-substituted pyrrole monomers which have relatively low conductivity in the range from about $10^{-3}$ ohm$^{-1}$cm$^{-1}$ ("S/cm" for convenience to indicate reciprocal ohms/cm) to 1 S/cm, while "conductors" have a conductivity in the relatively high range of from 1 to about 150 S/cm.

Poly(2,5-pyrrole) (referred to herein as "PP" for brevity), in which the —NH— group links sequences of conjugated double bonds, is normally an insulator, that is, has a conductivity less than about $10^{-10}$ S/cm and is totally insoluble in known solvents. It is known however, that electrochemically polymerized PP has good conductivity, but coupled with its melt-processing-resistance and the poor integrity of PP film so formed, it was deemed more desirable to produce the PP with a chemical process. Others have also sought to do so. In particular, German (FDR) Offenlegungsschrift DE No. 3321281 A1 published Dec. 22, 1983 discloses a chemical process for producing a conductive paper by impregnating the paper with different concentrations of an aqueous ferric chloride solution which is acidified with HCl, then exposing the impregnated paper to pyrrole monomer, usually in the gaseous phase. Further details of this process are disclosed in an article titled "Some Properties of Polypyrrole-Paper Composites" by Bjorklund, R. B. and Lundstroem, I., *Journal of Electronic Materials*, Vol. 13, No. 1, 1984.

As also stated in Bjorklund et al, they were aware that anhydrous FeCl$_3$ used as a dopant with poly-p-phenylene exists as an FeCl$_4$(2$^-$) complex in the polymer matrix, thus imparting conductivity to the polymer. Other polymers, for example polyacetylene impregnated with FeCl$_3$ or other oxidants such as SbCl$_5$, and, neutral polypyrrole which is exposed to FeCl$_3$ vapor or an anhydrous solution of the electrolyte, is also made conductive. But impregnating a preformed polymer with FeCl$_3$ to make it conductive does not suggest that one may use anhydrous FeCl$_3$ as an initiator to form the polymer from the pyrrole monomer, or that the FeCl$_3$ would generate a charged species in the polymer formed. As is well-known, poly-p-phenylene cannot be formed by initiation with FeCl$_3$ (see "Reaction of Ferric Chloride with Benzene", by P. Kovacic and C. Wu, *J. Polym. Sci.* Vol XLVII pg 45–54 at pg 45, first sentence of "Results", 1960), and the polymer is not conductive unless post-treated with FeCl$_3$.

The insulating character of PP produced by Naarman is attributable to the combination of AlCl$_3$ and Cu$^{+2}$Cl$_2$ as the initiator, further possibly to the low molar ratio of the initiator to the pyrrole in the reaction mixture.

With respect to polymers of 3- and/or 4-substituted pyrroles ("subs PP"), Bjorklund et al corroborate the generally well known fact that providing substituents on pyrrole does not improve the conductivity of the subs PP. Yet, with the process of my invention, the designated subs PP has relatively good conductivity.

As noted by Bjorklund et al, their precipitated PP was compactable under 10 ton pressure to form a wafer. PP precipitated in my polymerization reaction is compacted under far less pressure into a wafer which can be handled, but the wafer, unlike wafers or films produced from electrochemically produced PP, has essentially no tensile strength.

The conductive PP/subsPP of the prior art which polymers owe their conductivity to exposure to an electrolyte of a Group VIII metal, for example FeCl$_3$, whether by exposure to FeCl$_3$ vapor, or by impregnation with an anhydrous solution of electrolyte, derive their conductivity from a FeCl(2$^-$) counter ion in which the Fe (or other Group VIII metal) is always present. It was therefore surprising to find that excellent conductivity, as high as 150 S/cm, may be obtained with only Cl present as the counter ion, and without the presence of Fe.

Though it appeared that the type of initiator (electrolyte) would affect the electrical properties of the polymer, the possibility that the solvent might affect the charged species in the polymer was given little consideration. And the possibility that a single initiator could provide different charged species in the same polymer if it is formed under different conditions, was given even less consideration. Thus the formation of PP/subsPP+Cl$^-$ by a direct, single-step chemical process was both significant and unique.

SUMMARY OF THE INVENTION

I have discovered that pyrrole, optionally substituted with a wide variety of substituents in the 3- and/or 4-positions, may be polymerized in a chemical, but non-electrochemical reaction, to form a finely divided poly(2,5-pyrrole) which is conductive, is compactable but has essentially no tensile strength; and is therefore preferably applied to an insulating substrate to enhance its conductivity into the range from about $10^{-3}$ to about 150 S/cm.

It is therefore a general object of this invention to provide a process for forming an electrically conductive PP/subs PP polymer comprising, (a) dispersing a finely divided anhydrous polymerization initiator selected from the group consisting of halides of a Group VIII metal selected from iron, cobalt and nickel in an anhydrous organic liquid reaction medium with which said initiator is unreactive, so as to form a dispersion of said initiator in said medium, and, (b) adding anhydrous essentially pure liquid pyrrole monomer, optionally in solution in said medium, to said dispersion at a temperature in the range from above the freezing point of said medium to below its boiling point, so as to form said polymer which contains an ion selected from the group consisting of a Group VIII metal, halogen, and combinations thereof as charged species, said monomer having the structure

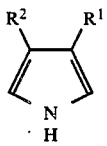
(I)

wherein, $R^1$ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, and benzyl which may optionally be ring-substituted with halogen or lower alkyl having from 1 to about 6 carbon atoms;

$R^2$ is selected from the group consisting of hydrogen hydroxyphenyl which may be ring-substituted, and an acyclic ether selected from the group consisting of (i) alkoxy represented by $-OR^3$, wherein $R^3$ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure $CH_3$-$(OCH_2CH_2)_{n'}$, wherein $n'$ is an integer in the range from 1 to about 20; and (iii) $R^4$—O—$R^5$ wherein either $R^4$ or $R^5$ is a linking group selected from phenyl and benzyl, each of which may be substituted, alkyl having from 1 to about 24 carbon atoms, and cycloalkyl having from 3 to about 7 ring carbon atoms one or more of which may be substituted; and, $R^1$ may be substituted with $R^2$, and if so substituted, each $R^2$ substituent may be the same or different; whereby said pyrrole polymer formed has a conductivity in the range from about $10^{-3}$ to about 150 ohm$^{-1}$cm$^{-1}$ ("S/cm").

It is also a general object of this invention to convert an insulating susbtrate having a conductivity in the range from about $10^{-15}$ to $10^{-6}$ S/cm into a conductive substrate having a conductivity in the range from $10^{-3}$ to about 150 S/cm, by applying to the substrate a conductive deposit of finely divided particulate PP/subsPP formed by the process of my invention.

It is another general object of this invention to provide a conductive PP/subsPP which has only a Cl or Br counterion and essentially no Group VIII metal ion, simply by conducting the polymerization reaction in a coordinating solvent such as acetonitrile. A coordinating solvent is one which can form a covalent bond with the Group VIII metal. The polymer so formed, indicated by PP/subsPP$^{+Cl-}$, or PP/subsPP$^{+Br-}$, is compactable, has high conductivity, and excellent compatibility with a human body in which it may be implanted.

It is a specific object of this invention to provide a process in which the conductivity of a PP/subs PP, as a shaped article formed by compaction, or as a conductive deposit applied to a substrate, may be tailored to produce (i) a semiconductor ($10^{-3}$ to 1 S/cm) by maintaining a molar ratio of initiator to pyrrole monomer in the range of from about 0.1 to about 1, more preferably about 0.25 to 1; and (ii) a conductor (1 to 150 S/cm) by maintaining a molar ratio of initiator to pyrrole monomer in the range from 1 to about 20, more preferably 1 to about 10, in a saturated solution of initiator in liquid reaction medium.

It is another specific object of this invention to provide a process in which one may produce a PP/subs PP conductor by maintaining the aforespecified molar ratio in a dialkyl ether reaction medium in which $FeCl_3$ (anhyd) is soluble, as is the monomer, so that a maximum value of S/cm is reached within a relatively short time after commencement of the reaction, after which time, the value diminishes, which general relationship of S/cm as a function of time is a unique characteristic of PP/subs PP produced by my process.

It is also a specific object of this invention to provide a process for making conductive paper having a conductivity in the range from $10^{-3}$ to about 150 S/cm for use in EMI shielding, battery and photovoltaic applications, antistatic packaging, and, backing for dielectric paper, inter alia.

It is a further specific object of this invention to provide a synthetic resinous insulating substrate such as poly(vinyl chloride) with a conductive surface; and, insulating inorganic solid filler materials such as aluminum trihydrate, glass spheres or fibers and the like with a conductive coating.

DETAILED DESCRIPTION OF PREFERRED EMBODIMENTS

The conductive polymer of this invention may be represented by the structure:

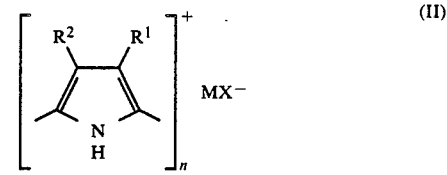
(II)

wherein, n is an integer in the range from 2 to about 100, and more preferably in the range from about 5 to about 20;

M represents a Group VIII metal selected from the group consisting of iron, nickel and cobalt;

X represents chlorine or bromine;

$R^1$ and $R^2$ have the same connotation as that given hereinbefore.

In the process of this invention, a finely divided compactable PP/subs PP is precipitated from a liquid reaction medium in which the polymerization of a pyrrole/-subs pyrrole monomer having the structure (I) is carried out under anhydrous conditions. By "liquid reaction medium" I refer to an organic liquid which is essentially unreactive with the polymerization initiator, or the monomer, unless the reaction medium is a coordinating solvent. For the anhydrous $FeCl_3$ Meek & Dragocoordination model, see "The Chemistry of Non-Aqueous Solvents" edited by J. J. Lagowski, Vol. I, Academic Press, New York (1966). By "anhydrous" conditions I refer to the reaction being carried out in the absence of moisture, particularly that the polymerization initiator be essentially free from bound water such as water of hydration.

It is most preferred that the reaction medium be a solvent for either the initiator or the monomer, and most preferably, for both. Where the reaction medium is a solvent for neither, the initiator is preferably used as a finely divided powder having a particle size in the range from about 5 microns to about 45 microns. When the reaction medium is a solvent for the initiator, it is preferred that the reaction medium be saturated with initiator. It is not essential that the initiator be highly soluble, and in most cases, the solubility is limited. By "soluble" I refer to initiators having a solubility in the range from about 5 to about 25 parts per hundred parts (pph) of solvent, a few initiators being more soluble. A solubility less than 5 pph is generally ineffective for the purpose of providing desirable speed of reaction.

Preferred initiators are the halides of iron, cobalt and nickel, preferably the fluoride, chlorides and bromides. Where stable iodides are used, the reactivity is generally not comparable to the chlorides and fluorides which are more preferred, for example ferric chloride, nickel chloride and cobalt chloride, and ferric fluoride, cobalt fluoride and nickel fluoride, all in the +3 state. Less preferred are cobalt bromide and nickel bromide.

The amount of the initiator used and its "freshness" generally controls the speed of the reaction and the molecular weight of the polymer, as is evidenced by the conductivity of the PP/subs PP formed. By "freshness" I refer to initiator which has not been aged, particularly by exposure to the atmosphere. If the initiator is essentially insoluble in the reaction medium, more initiator is generally required than if the initiator is soluble. Even when the initiator is soluble, it is preferably used in a major molar amount relative to the monomer, and preferably in the range from above 1 to about 20 moles of initiator to monomer, lesser amounts typically yielding a semiconductor polymer. Where the molar ratio of initiator to monomer is in the range from about 0.1 to about 1, and preferably from about 0.25 to 1, the polymer formed is a semiconductor. Where the molar ratio is in the range from 1 to about 20, and more preferably from 1 to about 10, the polymer formed is a conductor.

Unless the reaction medium used is a coordinating solvent, the particular solvent used is not narrowly critical except to the extent that it influences the properties of the polymer obtained, the extent of the influence usually being determined by simple trial and error such as one in this art would routinely expect to do.

A solvent in which there is no significant covalent bonding to the Group VIII metal of the initiator but nevertheless permits initiation of the polymer and its subsequent doping, is referred to herein as an "inert liquid" though it may have a solvating effect.

Liquids in which the initiator is poorly if at all soluble include the alkanes such as hexane, and cycloalkanes such as cyclohexane, all having from 4 to about 8 carbon atoms; aromatic liquids such as benzene, toluene and xylene; methoxy-xylene, nitro-xylene; halogenated aromatic liquids such as chlorobenzene, chlorotoluenes and chloroxylenes; hydrohalomethylenes particularly hydrochloromethylenes; chloroform perchloroethylene and carbon tetrachloride; sulfolane, 1,4-dioxane and dimethyl sulfone; and, lower primary alcohols having from 1 to about 6 carbon atoms; inter alia. Liquids in which the initiator is soluble include nitromethane and nitrobenzene; essentially unbranched dialkyl ethers having from 4 to about 20 carbon atoms, most preferably diethyl ether; propylene carbonate and N-methyl-2-pyrrolidone, and the like.

Coordinating solvents preferred in the process for forming the Group VIII metal-free polymer are the lower alkyl ($C_1$-$C_5$)nitriles, especially acetonitrile propionitrile and butyronitrile. It is because of their coordination properties that such solvents essentially prevent the Group VIII metal ion from being associated with the conductive PP formed.

The polymerization reaction may be carried out at room temperature, but is preferably carried out at slightly elevated temperature in the range from about 20° C. to about 80° C. The pressure is not critical and is usually atmospheric though subatmospheric pressures and elevated pressures as high as about 20 atm may be used, if desired. Reaction pressure is typically autogenous and the reaction proceeds under an inert gas (nitrogen) blanket. The reaction time is most preferably very fast, in the order of about 0.5 sec to about 5 sec, and is essentially instantaneous particularly when the polymer is deposited on a substrate such as paper.

The speed of the polymerization reaction where both the monomer and the initiator are in the liquid phase lends the reaction to a ready application to the impregnation of paper with conductive polymer in conventional paper making where a continuous sheet of paper is dipped first in monomer and then into an inert liquid containing initiator. All references to "monomer" herein refer to a pyrrole/subs pyrrole, and all those to "polymer" refer to PP/subs PP. Though porous substrates such as cellulosic and ceramic materials are preferred, semiconductors and conductors of this invention include any shaped article of ceramic or synthetic resinous material or any substrate which has been coated with polymer formed by the process of this invention.

Electrically non-conducting organic materials which may be made conductive include copolymers of butadiene with acrylic acid, alkyl acrylates or methacrylates, polyisoprene, polychloroprene, and the like; polyurethanes; vinyl polymers known as PVC resins such as polyvinyl chloride, copolymers of vinyl chloride with vinylidene chloride, copolymers of vinyl halide with butadiene, styrene, vinyl esters, and the like; polyamides such as those derived from the reaction of hexamethylene diamine with adipic or sebacic acid; epoxy resins such as those obtained from the condensation of epichlorohydrin with bisphenols, and the like; ABS resins, polystyrene, polyacrylonitrile, polymethacrylates, polycarbonates, varnish, phenol-formaldehyde resins, polyepoxides, polyesters, and polyolefin homo- and copolymers such as polyethylene, polypropylene, ethylene-propylene polymers, ethylene-propylenediene polymers, ethylene-vinyl acetate polymers, and the like.

Other organic insulators which can be made conductive include mixtures and blends of polymeric materials such as ABS resin blends, PVC and polymethacrylate blends, and blends of polyolefin homopolymers and copolymers such as blends of polypropylene in epdm polymers.

A compact of conductive PP/subs PP polymer may be used in an animal body as an implantable biosensor.

Inorganic insulating materials may also be made conductive or semiconductive. Such materials include fillers such as antimony oxide, aluminas, phosphates and the like, particularly those fillers used as fire retardants, and, insulating reinforcing materials such as glass spheres or fibers. Especially when the surface of glass fibers is treated, enough conductive polymer may be coated on the fibers so that when they are used to reinforce a shaped article of the synthetic resinous material, the article becomes conductive.

The procedure for applying the PP/subs PP polymer to a substrate is simple: A substrate to be coated is simply soaked in monomer and dipped in a solution/suspension (either of which is broadly referred to herein as a dispersion) of anhydrous initiator such as $FeCl_3$ in the reaction medium. Instantaneous polymerization occurs based on the oxidation-reduction potentials of the monomer/$FeCl_3$ system.

During polymerization, Fe and Cl are incorporated into the polymer as charges species, Fe being present in the range from about 3 to about 15% by wt of the polymer. If no charged species are present in the polymer, as is the case in neutral PP/subs PP formed particularly by electrodeposition, the polymer is an insulator.

Where Fe and Cl are present in combination as charged species in my polymer, the desired conductivity in the stated range may be imparted to the polymer or substrate to which it is applied by tailoring the parameters of the system, at all times, of course, using the anhydrous initiator. Where only Cl or Br as the counterion is desired, the concentration of the initiator and the temperature of the reaction affect the conductivity obtained, but it is essential that the initiator be anhydrous. The absence of water in the initiator is the parameter never heretofore recognized as being result-effective to give the particular properties of conductive polymers formed by this invention.

Quite surprising is that irrespective of the surface of the substrate, as long as it is essentially free of moisture, the polymer applied to the substrate is strongly adhered to it. The inertness of the polymer and its insolubility in commonly available solvents under acid or base conditions, ensures that the conductivity of the coated substrate will survive for a long period of time.

The amount of polymer deposited on the substrate may be controlled so that from about 0.001% to about 25% by wt of the substrate is polymer, in most instances from 0.1% to about 5% by wt being adequate to provide the desired conductivity.

Quite noteworthy is that when the substrate is first soaked in the dispersion, whether solution or suspension, of initiator in reaction medium, then dipped in pyrrole/subs pyrrole monomer, the formation of polymer is slower than when the order of the steps is interchanged, and the conductivity of the polymer is generally in the semiconductor range or lower. Thus, the conductivity of the polymer, or the substrate to which the polymer is applied, may be tailored by a choice of whether the monomer is added to liquid containing the initiator, or whether the liquid containing initiator is added to the monomer. Of course where the substrate is to be made highly conductive quickly, the substrate will be first coated with monomer and then dipped into liquid containing initiator for speed of reaction and higher conductivity; and, for a semiconductor, substrate is first coated with initiator, then dipped into monomer so as to have lower conductivity.

When the polymer is desired in a finely divided particulate form, monomer is simply poured into the dispersion of initiator. Again, as might be expected, the conductivity of the polymer as measured from a compact of the powder, will vary depending upon the process conditions particularly the ratio of initiator to monomer, the physical properties of the inert liquid, and the temperature at which the polymerization reaction takes place.

The invention is more fully described by the following illustrative examples.

EXAMPLE 1

Oxidative Polymerization of Pyrrole 19.6 g (0.12 mole) of fresh anhydrous $FeCl_3$ is dispersed in 300 ml of anhydrous diethyl ether in which some of the $FeCl_3$ is dissolved so as to form a saturated solution, while stirring under a $N_2$ atmosphere at 22° C. To this stirred saturated solution is added 2.1 ml (0.03 mole) of freshly distilled pyrrole in one portion. The reaction mixture instantly acquires a black color and a slight exotherm results. After allowing the reaction to proceed for 1 hr at 22° C. the black precipitate is filtered and washed with water, then with 50 ml of 10% HCl and again with water until the washings register about ph 7. It is essential that dilute HCl, preferably less than 20%, and not conc HCl, be used to preserve the charged species of Fe and Cl in combination. Finally, the black polymer is washed with ethanol and diethyl ether and dried for 4 hr in vacuo at 65° C. The product yield is 2.77 g.

A measurement of the DC four-point probe conductivity of the black powder gives a value of 46 S/cm at 22° C.

Elemental analysis (% by wt) of the PP product is made for C and H together in a modified Perkin Elmer 240 Analyzer as described in *The Microchemical Journal*, Vol 24, No 3, pg 300 et seq (Sept. 1979). O is determined by a $CO_2$ coulometer as is conventionally done. N is measured by a modified Dumas system. Fe is determined by atomic absorption; and, Cl by the Schöniger oxygen flask combustion method. The analysis is as follows:

Found (% by wt)
C=51.96
H=3.89
N=14.88
Fe=7.17
Cl=13.41
O=8.69

The oxygen in the forming analysis derives fron the wash water trapped with the PP, which has a well known proclivity for O. Because the atomic ratio of Cl to Fe is closer to 3 than to 4, the calculated analysis (below) is based on $C_4H_3N(FeCl_3)_{0.12}.0.5H_2O$, the water being derived from washing, and is as follows:

Calculated (% by wt)
C=51.35
H=4.32
N=14.98
Fe=7.16
Cl=13.64
O=8.55

EXAMPLE 2

Low Temperature Oxidative Polymerization of Pyrrole 39.2 g (0.242 mole) of fresh anhydrous $FeCl_3$ is dispersed in 600 ml of anhydrous diethyl ether in which some of the $FeCl_3$ is dissolved so as to form a saturated solution, while stirring under a $N_2$ atmosphere at 22° C. This solution is chilled to 0° C. and to this chilled and stirred saturated solution is added 4.2 ml (0.61 mole) of freshly distilled (from KOH) pyrrole, at 0° C., in a single portion. The reaction mixture instantly acquires a black color and reaches about 8° C. due to the exotherm. After allowing the reaction to proceed for 1 hr at 0° C. with stirring, the black precipitate is filtered and washed with distilled water, then with 100 ml of 10% HCl, until the washings register about pH 7. Finally, the black polymer is rinsed with ethanol and then diethyl ether and dried for 4 hr in vacuo at 65° C. The product yield is 4.77 g (dry wt).

A measurement of the DC four-point probe conductivity of the black powder gives a value of 90 S/cm at 22° C.

Because the atomic ratio of Cl to Fe is closer to 4 than to 3, the calculated analysis (below) is based on $C_4H_3N(FeCl_4)_{0.07}\cdot 0.4H_2O$, the water being derived from washing, and, the analysis made in a manner analogous to that described hereinabove is as follow:

| Found (% by wt) | Calculated (% by wt) |
| --- | --- |
| C = 56.11 | C = 55.78 |
| H = 3.85 | H = 4.46 |
| N = 15.95 | N = 16.27 |
| Fe = 4.37 | Fe = 4.54 |
| Cl = 12.44 | Cl = 11.53 |
| O = 6.94 | O = 7.43 |

EXAMPLE 3

Oxidative Polymerization of 3-methyl-4-hexyloxyphenyl pyrrole

In a manner analogous to that described in example 1 hereinabove, 2.52 g (0.0155 mole) of fresh anhydrous $FeCl_3$ is dispersed in 30 ml of anhydrous diethyl ether at 22° C. under a $N_2$ atmosphere. 1.0 g (0.00388 mole) of 3-methyl-4-hexyloxyphenyl pyrrole is dissolved in 10 ml of anhydrous diethyl ehter and this solution added to stirred $FeCl_3$ solution. The black polymer formed is worked up with washing in water and and then dilute mineral acid to yield 0.65 g of product which is a black free-flowing powder. This powder is soluble in several organic solvents, particularly lower alkanols having from 1 to about 6 carbon atoms, and ethers having less than 20 carbon atoms. A measurement of the DC four-point probe conductivity of the powder gives a value of $8 \times 10^{-3}$ S/cm at 22° C.

Because the atomic ratio of Cl to Fe is closer to 4 than to 3, the calculated analysis (below) is based on $C_{17}H_{21}NO(FeCl_4)_{0.22}\cdot 0.4H_2O$, the water being derived from washing, and, the analysis made in a manner analogous to that described hereinabove is as follows:

| Found (% by wt) | Calculated (% by wt) |
| --- | --- |
| C = 65.81 | C = 66.70 |
| H = 6.85 | H = 7.19 |
| N = 4.71 | N = 4.58 |
| O = 7.39 | O = 7.32 |
| Fe = 4.37 | Fe = 4.54 |
| Cl = 12.44 | Cl = 11.53 |

The structure, confirmed by IR and NMR analysis, is as follows:

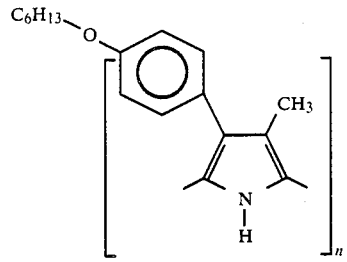

EXAMPLE 4

Oxidative Polymerization of 3-methyl-4-phenyl pyrrole

In a manner analogous to that described in example 3 hereinabove, 4.15 g (0.026 mole) of fresh anhydrous $FeCl_3$ is dispersed in 50 ml of anhydrous diethyl ether at 22° C. under a $N_2$ atmosphere. This solution is chilled to 0° C. and to it is added 1.0 g (0.0064 mole) of 3-methyl-4-phenyl pyrrole dissolved in 14 ml of anhydrous diethyl ether which has been chilled to 0° C. The reaction mixture turns black and the temperature rises to about 6° C. The black polymer formed is worked up with washing in water and then dilute mineral acid (50 ml of 10% HCl solution) to yield, after drying, 1.1 g of product. This product is a solid particulate material which is soluble in organic solvents, particularly halocarbons such as dichloromethane, lower alkanols and ethers such as tetrahydrofuran. A measurement of the DC four-point probe conductivity of the powder gives a value of $4.3 \times 10^{-3}$ S/cm at 22° C.

Because the atomic ratio of Cl to Fe is about 3.8, the calculated analysis (below) is based on $C_{11}H_9N(FeCl_{3.8})_{0.11}\cdot 0.9H_2O$, the water being derived from washing, and, the analysis made in a manner analogous to that described hereinabove is as follows:

| Found (% by wt) | Calculated (% by wt) |
| --- | --- |
| C = 68.01 | C = 68.67 |
| H = 4.66 | H = 5.67 |
| N = 7.14 | N = 7.28 |
| O = 7.25 | O = 7.48 |
| Fe = 2.98 | Fe = 3.19 |
| Cl = 7.04 | Cl = 7.70 |

EXAMPLES 5-11

Effect of $FeCl_3$ conc. in the reactor

In the following examples, the concentration of finely divided anhydrous $FeCl_3$ initiator in solution in diethyl ether anhydrous inert liquid medium is varied in the range from 1 to 8 moles of $FeCl_3$ per mole of pyrrole monomer, the volume of diethyl ether being held constant at 300 ml, without regard to the amount of initiator which goes into solution. Generally, the volume of inert liquid used is based on the volume of initiator used. Since, to make polymers having the desired range of conductivity, at least 0.1 mole of initiator per mole of monomer is used, at least an equal volume of initiator and inert liquid is necessary. A volume ratio of 100 (inert liquid to initiator) results in too slow a reaction, and a ratio less than 1 is impractical. Thus, since the reaction is carried out in a liquid medium, and the ratio of initiator to monomer is the prime determinative factor for the conductivity of the polymer formed, a preferred range for the volume ratio of inert liquid to initiator is from about 1:1 to about 100:1, more preferably about 5 to about 50, without regard to the amount of initiator which goes into solution. With 300 ml diethyl ether, a saturated solution of $FeCl_3$ is formed at a molar ratio of about 4, portion of the $FeCl_3$ being dispersed in the ether at higher ratios. All polymerizations in Table I herebelow are carried out at 22° C., and DC, four-point probe conductivities are measured at 22° C.

TABLE I

| Ex. No. | mole ratio $FeCl_3$/pyrrole | conductivity S/cm |
| --- | --- | --- |
| 5 | 0.5 | $1 \times 10^{-3}$ |
| 6 | 1 | 1 |
| 7 | 2 | 5 |
| 8 | 3 | 20 |
| 9 | 4 | 40 |
| 10 | 4* | 90 |
| 11 | 8 | 34 |

*polymerization carried out at 0° C.

As will be evident from the foregoing Table I, a molar ratio greater than 4 appears to yield a reaction product having about the same conductivity as that obtained with a ratio of 4, at 22° C., but the conductivity is increased when the reaction is carried out at 0° C.

EXAMPLES 12-19

Effect of time of polymerization reaction on conductivity of polymer

The following results are particularly noteworthy because known conjugated conductive polymers exhibit an increased level of electrical conductivity when the time of exposure to the oxidant (dopant) is increased. In the following series of experiments, the inert liquid medium was diethyl ether and its volume in each case was 300 ml though the ratio of $FeCl_3$ to pyrrole was varied in the range from 4:1 to 1:1. DC four-point probe conductivity measurements in the following Table II were carried out on pressed powder discs at 22° C.

TABLE II

| Ex. No. | mole ratio $FeCl_3$/pyrrole | reaction time (hr) | conductivity S/cm |
| --- | --- | --- | --- |
| 12 | 4 | 66 | 0.05-0.3 |
| 13 | 4 | 4 | 5.9 |
| 14 | 4 | 1 | 42 |
| 15 | 3 | 48 | 0.05 |
| 16 | 3 | 1 | 16 |
| 17 | 2 | 68 | 0.005 |
| 18 | 1 | 70 | 0.014 |
| 19 | 1 | 1 | 2.6 |

EXAMPLE 20

Insulator substrates made conductive

A. A strip of filter paper (Whatman #4) is soaked in anhydrous pyrrole and the excess wiped off. The pyrrole-soaked paper is dipped in a dispersion of 45 g of $FeCl_3$ in 300 ml diethyl ether and immediately withdrawn. The paper instantaneously acquires the black color characteristic of PP. After washing with water, methanol and ether, the paper substrate coated with the polymer is allowed to dry for 1 hr and the conductivity measured at 22° C. as in the previous examples. The value obtained is 10 S/cm.

B. In a manner analogous to that described immediately hereinabove, a strip of Geon ® 103 EP poly(vinyl chloride) (PVC) film 6 mils thick, which is commercially available, is soaked in anhdyrous pyrrole for 30 min. The pyrrole-soaked PVC film is wiped to remove excess pyrrole and dipped into saturated initiator solution such as is used in 20A. As before, the film instantly acquires a balck color indicating the substrate has been coated with PP. The film is withdrawn, washed with water, methanol and ether and allowed to dry for 1 hr. The conductivity obtained was 1.38 S/cm.

In an analogous manner, materials such as glass fibers which are insulators at ambient temperatures may be made conductve or semiconductive, as desired. Though this process lends itself particularly well to applying conductive PP/subs PP to laminar articles, they may be of arbitrary shape, and it is not critical how the pyrrole is applied to the article, or whether the pyrrole-coated article is dipped into the initiator solution. For example, either one, or both the pyrrole and the initiator solution may be sprayed onto the substrate before polymerization.

EXAMPLE 21

Conductive fillers (reinforcing) for making filled (reinforced) polymers

A. 30 g of antimony oxide ($Sb_2O_3$) flour having a primary particle size in the range from about 1-5 microns is soaked in pyrrole, the excess pyrrole centrifuged off, and the pyrrole coated flour stirred into saturated initiator solution such as was used in 20A. Soon thereafter the solution is filtered, and the black powder obtained is worked up as before by washing, and dried. 20 g of the coated flour are milled with 100 g of PVC and extruded into a thin sheet 6 mils thick. The sheet is conductive (about 5 S/cm) and the flame retarding characteristics of the flour are maintained.

B. 20 g of $Sb_2O_3$ flour are milled into 100 g of PVC and extruded into a film 6 mils thick. The filled film is then treated as described in example 20B hereinabove. The conductivity obtained is about 4 S/cm.

C. 40 g of alumina trihydrate having a primary particle size in the range from about 1-45 microns is soaked in pyrrole as described in 21A hereinabove, the excess pyrrole removed, and the coated powder is stirred into initiator solution, filtered and dried. 20 g of the alumina trihydrate coated with PP are milled into PVC and extruded into 6 ml thick film. The film obtained has a conductivity of about 4 S/cm and the flame retarding qualities of the alumina trihydrate are retained.

D. 20 g of alumina trihydrate powder are milled into 100 g of PVC and extruded into 6 mil thick film. The filled film is then treated as described in example 20A hereinabove. The conductivity obtained is about 5 S/cm.

In the foregoing examples 21C and D, the presence of water chemically bound in the alumina trihydrate does not appear to affect the effectiveness of the process because the water is not available for removal by the anhydrous inert liquid medium.

Glass or other fibers made from refractory ceramic materials may analogously be first coated with PP and then used for reinforcing polymer, or, the fibers may first be incorporated in the polymer to reinforce it, then the reinforced polymer is coated with PP, though it will be appreciated the conductivities obtained in each case will be different.

From the data presented in Table I it is evident that conductivity is increased at lower polymerization temperatures, but the rate of polymerization decreases. The polymerization may be carried out at any temperature above the freezing point of the inert liquid, but in practice, a temperature in the range from about −50° C. to about 35° C., more preferably from −20° C. to 30° C., is preferred.

It will also be evident that the conductivity of PVC is substantially the same whether the conductive powder fillers are milled into the PVC before it is extruded; or, the PVC is milled with insulating powder, extruded, and then coated with PP. Much greater differences in conductivity are obtained with substrates which are coated with pyrrole first, then dipped into the initiator solution, and vice versa.

EXAMPLE 22

Preparation of PP+Cl− (polypyrrole chloride) in acetonitrile 300 ml anhydrous $FeCl_3$ and 300 ml of dry acetonitrile are stirred at reflux for 1 hr under a $N_2$ blanket. The dark brown-red mix is cooled to room temperature. 2.1 ml of pyrrole freshly distilled over KOH is now added in a single portion. The mix turns black instantly and an exotherm to 27° C. is noted. The reaction is continued for 1 hr at ambient conditions under $N_2$ and protected from light. The reaction mixture is filtered, and the black precipitate is washed with copious amounts of water until neutral to pH paper, then rinsed with ethanol, then ether. The precipitate is then dried under vacuum at 65° C. and weighed. 1.15 g is recovered. The conductivity of the precipitate when compacted is about 0.27 S/cm. The following results are obtained upon analysis:

| Found (% by wt) | | Structure: |
|---|---|---|
| C = 56.57 | | |
| H = 4.15 | | $\left[\begin{array}{c} R^2 \quad R^1 \\ \diagup\!\!\!\diagdown \\ N \\ H \end{array}\right]_n^+ X^-$ |
| N = 15.67 | | |
| Cl = 14.08 | | |
| Fe = 0.32 | (negligible) | |
| O = 9.21 | | |
| | | $R^1$ and $R^2$ are each H |
| | | X represents chlorine |

The foregoing corresponds to the empirical formula $C_{4.2}H_{3.67}N_{1.0}O_{0.53}Cl_{0.35}$

EXAMPLE 23

Preparation of PP in aqueous acid

Reagents: Pyrrole (distilled over KOH)=2.1 ml

| $FeCl_3.6H_2O$ | 10.0 g |
|---|---|
| 0.01 M HCl | 100 ml |

When the 0.01M HCl solution is stirred with the $FeCl_3.6H_2O$ added to it, a brown solution results at room temperature under $N_2$. To this solution is added all the pyrrole. The mixture turns black instantly and the temperature rises to 28° C. The reaction is continued for 1 hr at ambient conditions under $N_2$ while being protected from light. The mixture is then filtered, the black precipitate is washed with water, then rinsed with ethanol, and finally with ether. The precipitate is then dried under vacuum at 65° C. The yield of precipitate is 1.12 g. The conductivity of a compact of the polymer is found to be about 16 S/cm.

Compared to an analogous reaction carried out in anhydrous diethyl ether with anhydrous $FeCl_3$, the yield under anhydrous conditions is about 60% better, and the conductivity is about 70% better.

EXAMPLE 24

Preparation of PP with anhydrous and hydrated $FeCl_3$ for comparison

A. 32.7 g of $FeCl_3.6H_2O$ (0.12 mol $FeCl_3$) is weighed into a reactor under a $N_2$ blanket, 300 ml ether is added (under $N_2$) and the mix stirred for 30 min while the mixture is protected from light. 2.1 ml of pyrrole is dumped into the reactor and the reaction continued for 1 hr at ambient temperature. Thereafter the black reaction mixture is filtered with difficulty. Addition of HCl, and allowing it to stand overnight, facilitates filtration. The precipitate obtained is washed well with water, then with ethanol and finally with ether before it is dried in vacuum at 65° C. 0.65 g precipitate is recovered. The conductivity of a compact of the precipitate is about 0.1 S/cm.

B. In an analogous manner to that described immediately hereinabove, 2.1 ml of pyrrole in anhydrous diethyl ether containing 0.12 mol anhydrous $FeCl_3$ are reacted, and the precipitate recovered by washing and filtering, as described. The amount of precipitate recovered is 2.8 g. The conductivity of a compact of the precipitate is 50 S/cm.

A comparison indicates that the yield with hydrated $FeCl_3$ is much lower (4 times worse), as is the conductivity (500 times less).

EXAMPLE 25

Preparation of PP in presence of aqueous HCl acid 19.6 g of $FeCl_3$ are stirred into 300 ml of water to which 15 ml of conc HCl are added. The solution temperature rises to about 35° C. and the pyrrole is added in a single portion. The mixture turns black instantly, and the reaction is continued for 1 hr at ambient conditions under $N_2$ and protected from light. After 1 hr a black precipitate is recovered which is rinsed with 10% HCl, washed with water, then rinsed sequentially with ethanol and ether. After drying at 65° C. under vacuum 2.84 g of ppte is recovered. A compact of the polymer has a conductivity of 7 S/cm which is lower than that obtained under acid-free anhydrous conditions.

It will be evident that the charges depicted on the concutive PP/subs PP are not quantitative. The counterions when the Group VIII metal is Fe may be $FeCl_4^-$, $FeCl_4(2-)$ or $FeCl_6(3-)$.

What is claimed is:

1. A process for preparing an electrically conductive pyrrole polymer ("PP")/substituted pyrrole polymer ("subs PP"), comprising,
   (a) dispersing a finely divided anhydrous polymerization initiator selected from the group consisting of halides of a Group VIII metal selected from iron, cobalt and nickel in an anhydrous inert liquid reaction medium so as to form a dispersion of said initiator in said medium, and,
   (b) adding anhydrous essentially pure liquid pyrrole/-substituted pyrrole monomer which is soluble in said reaction medium, to said dispersion at a temperature in the range from above the freezing point of said inert liquid to below its boiling point, so as to form said polymer which contains an ion selected from the group consisting of said Group VIII metal, halogen, and combinations thereof, as charged species, said monomer having the structure

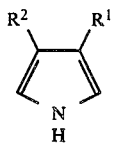

wherein, $R^1$ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, benzyl, and benzyl which is ring-substituted with halogen or lower alkyl having from 1 to about 6 carbon atoms;

$R^2$ is selected from the group consisting of hydrogen, hydroxyphenyl, hydroxyphenyl which is ring-substituted, and an acyclic ether selected from the group consisting of (i) alkoxy represented by $-OR^3$, wherein $R^3$ represents alkyl having from 1 to about 12 carbon atoms, alkoxyalkyl having from 2 to about 24 carbon atoms, phenyl or substituted phenyl, benzyl or substituted benzyl, heteroaryl or substituted heteroaryl; (ii) polyalkoxy represented by the structure $CH_3-(-OCH_2CH_2-)_{n'}$, wherein $n'$ is an integer in the range from 1 to about 20; and (iii) $R^4-O-R^5$ wherein either $R^4$ or $R^5$ is a linking group selected from phenyl and benzyl, each of which may be substituted, alkyl having from 1 to about 24 carbon atoms, and cycloalkyl having from 3 to about 7 ring carbon atoms one or more of which may be substituted; and, $R^1$ may be substituted with $R^2$, and if so substituted, each $R^2$ substituent may be the same or different; whereby said PP/subs PP formed has a conductivity in the range from about $10^{-3}$ to about 150 ohm$^{-1}$cm$^{-1}$ ("S/cm").

2. The process of claim 1 wherein the order of steps (a) and (b) is reversible to obtain a lower conductivity than that obtained in the order set forth in claim 1.

3. The process of claim 1 wherein said initiator is present in an amount in the range from about 0.1 mole to about 10 moles per mole of said monomer, and the volume of said inert liquid is at least equal to the volume of initiator.

4. The process of claim 3 wherein said inert liquid is selected from alkanes and cycloalkanes having from 4 to about 8 carbon atoms, aromatic liquids, halogenated aromatic liquids, hydrohalomethylenes, chloroform, perchloroethylene, sulfolane, 1,4-dioxane, dimethyl sulfone, and lower primary alcohols having from 1 to about 6 carbon atoms, in any of which foregoing liquids said initiator is poorly if at all, soluble; and, nitromethane, nitrobenzene, and dialkyl ethers having from 4 to about 20 carbon aotms, propylene carbonate and N-methyl-2-pyrrolidone in which liquids said initiator is substantially soluble.

5. The process of claim 3 wherein a molar ratio of initiator to monomer in the range from about 0.25 to about 1 yields a semiconductor; a ratio in the range from about 1 to about 10 yields a conductor; and, the volume ratio of inert liquid to initiator is in the range from 1:1 to about 100:1, without regard to the amount of initiator, if any, which goes into solution.

6. The process of claim 3 wherein said initiator is selected from the fluorides, chlorides and bromides of iron, nickel and cobalt, and said Group VIII metal is present in the +3 state.

7. The process of claim 4 wherein a semiconductor has a conductivity in the range from about $10^{-3}$ to about 1 S/cm; and a conductor has a conductivity in the range from about 1 to about 150 S/cm.

8. The process of claim 5 wherein polymerization is initiated at a temperature in the range from about $-20°$ C. to about $30°$ C.

9. The process of claim 6 wherein said monomer is selected from the group consisting of pyrrole, 3-methyl-4-hexyloxyphenyl pyrrole, and 3-methyl-4-phenyl pyrrole.

10. The process of claim 6 wherein said dispesion is a saturated solution of said initiator in said inert liquid and said PP/subs PP formed is a conductor.

11. The process of claim 6 wherein said monomer is pyrrole, said initiator is $FeCl_3$ and said inert liquid is a diethyl ether.

12. A process for preparing a pyrrole/substituted pyrrole polymer ("PP/subs PP") linked through N-adjacent carbon atoms of the pyrrole nucleus, said polymer being represented by the structure

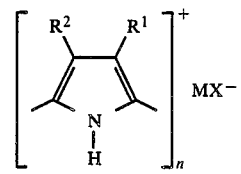

wherein, n is an integer in the range from about 2 to about 100;

M represents a Group VIII metal selected from the group consisting of iron, nickel and cobalt;

X represents chlorine or bromine;

$R^1$ is selected from the group consisting of hydrogen, alkyl having from 1 to about 6 carbon atoms cycloalkyl having from 3 to about 7 ring carbon atoms one or more of which may be substituted, alkoxyalkyl having from 3 to about 24 carbon atoms, benzyl, and benzyl which is ring-substituted with halogen or lower alkyl having from 1 to about 6 carbon atoms;

$R^2$ is selected from the group consisting of hydrogen, hydroxyphenyl, hydroxyphenyl which is ring-substituted, and an acyclic ether selected from the group consisting of (i) alkoxy represented by $-OR^3$, wherein $R^3$ represents alkyl having from 1 to about 12 carbon atoms, alkoxyalkyl having from 2 to about 24 carbon atoms, phenyl or substituted phenyl, benzyl or substituted benzyl, heteroaryl or substituted heteroaryl; (ii) polyalkoxy represented by the structure $CH_3-(-OCH_2CH_2-)_{n'}$ wherein $n'$ is an integer in the range from 1 to about 20; and (iii) $R^4-O-R^5$ wherein either $R^4$ or $R^5$ is a linking group selected from phenyl and benzyl, each of which may be substituted, alkyl having from 1 to about 24 carbon atoms, and cycloalkyl having from 3 to about 7 ring carbon atoms one or more of which may be substituted; and, $R^1$ may be substituted with $R^2$, and if so substituted, each $R^2$ substituent may be the same or different; said process comprising,
  (a) dispersing an anhydrous polymerization initiator selected from the group consisting of halides of a Group VIII metal selected from iron, cobalt and nickel in an anhydrous inert liquid reaction medium so as to form a dispersion of said initiator in said medium, and,
  (b) adding anhydrous essentially pure liquid pyrrole/substituted pyrrole monomer which is soluble in said reaction medium, to said dispersion at a temperature in the range from above the freezing point of said reaction medium to below its boiling point,
whereby said PP/subs PP formed contains an ion selected from the group consisting of said Group VIII metal, halogen, and combinations thereof present as charged species, and has a conductivity in the range from about $10^{-3}$ to about 150 S/cm.

13. The process of claim 12 wherein the order of steps (a) and (b) is reversible to obtain a lower conductivity than that obtained in the order set forth in claim 12.

14. The process of claim 12 wherein said inert liquid is selected from alkanes and cycloalkanes having from 4 to about 8 carbon atoms, aromatic liquids, halogenated aromatic liquids, hydrohalomethylenes, chloroform, perchloroethylene, sulfolane, 1,4-dioxane, dimethyl sulfone, and lower primary alcohols having from 1 to about 6 carbon atoms, in any of which foregoing liquids said initiator is poorly if at all, soluble; and, nitromethane, nitrobenzene, and dialkyl ethers having from 4 to about 20 carbon aotms, propylene carbonate and N-methyl-2-pyrrolidone in which liquids said initiator is substantially soluble.

15. The process of claim 12 wherein a molar ratio of initiator to monomer in the range from about 0.25 to about 1 yields a semiconductor; a ratio in the range from about 1 to about 10 yields a conductor; and, the volume ratio of inert liquid to initiator is in the range from 1:1 to about 100:1, without regard to the amount of initiator, if any, which goes into solution.

16. The process of claim 12 wherein said initiator is selected from the fluorides, chlorides and bromides of iron, nickel and cobalt, and said Group VIII metal is present in the +3 state.

17. The process of claim 16 wherein polymerization is initiated at a temperature in the range from about −20° C. to about 30° C.

18. The process of claim 17 wherein said monomer is selected from the group consisting of pyrrole, 3-methyl-4-hexyloxyphenyl pyrrole, and 3-methyl-4-phenyl pyrrole; said dispersion is a saturated solution of $FeCl_3$ in diethyl ether; and said PP/subs PP formed is a conductor having a conductivity of from about 1 to about 150 S/cm.

* * * * *

UNITED STATES PATENT AND TRADEMARK OFFICE
CERTIFICATE OF CORRECTION

PATENT NO. : 4,764,573
DATED : August 16, 1988
INVENTOR(S) : Ronald Eugene Myers It is certified that error appears in the above-identified patent and that said Letters Patent is hereby corrected as shown below:

Column 3, line 34, in the formula, the small "n" delete the comma and place a prime mark instead.

Column 9, line 16, "follow" should read ---follows---.

Column 9, line 39, "ehter" should read ---ether---.

Column 12, line 1, "anhydrous" is misspelled.

Column 12, line 5, "black" is misspelled.

Column 14, line 51, "conductive" is misspelled.

Column 15, line 31, in the formula, the small "n" delete the comma and place a prime mark instead.

Column 15, line 61, "atoms" is misspelled.

Column 16, line 18, "dispesion" should read ---dispersion---.

Signed and Sealed this

Twelfth Day of September, 1989

*Attest:*

DONALD J. QUIGG

*Attesting Officer*  Commissioner of Patents and Trademarks